United States Patent [19]

Williams

[11] Patent Number: 4,940,929
[45] Date of Patent: Jul. 10, 1990

[54] AC TO DC CONVERTER WITH UNITY POWER FACTOR

[75] Inventor: James B. Williams, Westford, Mass.
[73] Assignee: Apollo Computer, Inc., Chelmsford, Mass.
[21] Appl. No.: 370,611
[22] Filed: Jun. 23, 1989
[51] Int. Cl.⁵ .............................................. G05F 1/613
[52] U.S. Cl. .................................... 323/222; 323/285
[58] Field of Search ............... 323/222, 224, 282, 283, 323/284, 285, 286, 287; 363/20, 21, 97, 41

[56] References Cited

U.S. PATENT DOCUMENTS

| | | | |
|---|---|---|---|
| 3,571,697 | 3/1971 | Phillips . | |
| 3,696,286 | 10/1972 | Ule . | |
| 4,084,103 | 4/1978 | Burns, III, et al. . | |
| 4,328,710 | 12/1980 | Nelson . | |
| 4,355,240 | 10/1982 | Hamilton | 323/283 |
| 4,384,321 | 5/1983 | Rippel | 363/124 |
| 4,412,277 | 10/1983 | Mitchell . | |
| 4,437,146 | 3/1984 | Carpenter | 323/222 |
| 4,467,268 | 8/1984 | Chambers et al. . | |
| 4,677,366 | 6/1987 | Wilkinson et al. | 323/222 |
| 4,683,529 | 7/1987 | Bucher, II. . | |
| 4,792,887 | 12/1988 | Bernitz et al. . | |
| 4,837,495 | 6/1989 | Zansky | 323/222 |

Primary Examiner—Peter S. Wong
Attorney, Agent, or Firm—Hamilton, Brook, Smith & Reynolds

[57] ABSTRACT

An AC to DC converter comprises a bridge rectifier followed by a boost circuit. The boost circuit includes an inductor, diode and load capacitor in series and a shunting switch connected to shunt the diode and load capacitor. The control circuit for switching the shunting switch comprises a differential circuit, a multiplier and a duty cycle generator in a feedback loop which maintains a constant output voltage on the capacitor. To eliminate the response to ripple on the output voltage, the differential circuit does not respond to voltages within a dead band.

19 Claims, 7 Drawing Sheets

AC TO DC CONVERTER WITH UNITY POWER FACTOR

BACKGROUND OF THE INVENTION

In the computer workstation market, there is a demand for more computing power which requires more electric power. At the same time, it is advantageous to allow use of power from a standard 120V wall outlet. Customers are understandably reluctant to rewire offices with nonstandard outlets. Not only does this represent extra cost, but any time the workstation is moved, the rewiring must be repeated. A power supply with unity power factor input is an important step in addressing this need.

The average power obtained from an AC supply through an AC to DC converter is always something less than the product of the RMS voltage and RMS current. The ratio of the average power to the product of RMS voltage and current is known as the power factor. A typical switching power supply has an input power factor of 65%; this means that the power drawn from the utility line is 65% of the product of the voltage and current in the utility line and only 65% of what could be obtained with unity power factor.

The voltage supplied from an outlet is sinusoidal, but the system typically draws nonsinusoidal current. Unity power factor is obtained by assuring that a sinusoidal current, synchronized to the sinusoidal voltage, is drawn. Assuring that the current is sinusoidal also limits harmonic current, a feature required by some specifications.

One class of AC to DC converter which provides for power factors approaching unity is that of a full wave rectifier followed by a boost converter. In the boost converter, the output of the full wave rectifier is applied to a series connection of an inductor, diode and load capacitor. The charge carried by the load capacitor is the supply seen by the computer or other device utilizing the power. A shunting switch is coupled from a node between the inductor and diode to ground. The shunting switch is alternately opened and closed at a high frequency such as 40 kilohertz. When the switch is closed, the inductor is energized by current from the bridge rectifier to ground. When opened, the inductor relaxes and drives a current spike through the diode to charge the capacitor. In such a system, the duty cycle of the switch can be controlled such that the current closely follows the voltage applied from the bridge rectifier in waveform. The duty cycle of the shunting switch can be controlled by means of a feedback circuit to assure that the output voltage stored on the load capacitor is retained at a desired level. An example of such a boost converter can be found in U.S. Pat. No. 4,677,366 to Wilkinson et al.

SUMMARY OF THE INVENTION

In accordance with the present invention, an AC to DC converter comprises a boost circuit which includes an inductor and diode connected in series with a load capacitor and a shunting switch connected to shunt the diode and load capacitor. The shunting switch is controlled by a control circuit at a frequency which is high relative to the frequency of the AC input. The control circuit includes a differential circuit for comparing an output voltage signal, which indicates the voltage on the load capacitor, to at least one reference to generate a feedback signal.

In the preferred embodiments, the feedback signal is a multiplier which is applied to a multiplying circuit. The value of the multiplier is such that the product of the multiplier and a voltage input signal is proportional to the current through the inductor which is required to provide a desired level of the output voltage. The multiplier and the voltage input are applied to the multiplying circuit to generate a current command signal. A duty cycle generator responds to the current command signal to control the duty cycle of the shunting switch.

Due to the pulsating nature of the power input from the AC line, there is necessarily some ripple voltage at the output at twice the line frequency. In conventional converters, this ripple is fed back through the loop regulating the output and causes distortion in the input current waveform thereby causing a deviation from the desired unity power factor input. In accordance with the present invention, the differential circuit includes means to eliminate response of the feedback circuit to the ripple.

In the preferred system, the differential circuit responds rapidly to levels of the output voltage which are outside of high and low limits of amplitude. The differential circuit does not respond, or responds slowly, to levels of the output voltage which are in a dead band within the high and low limits of amplitude. The difference between the high and low limits of the differential circuit is set to be about equal to but greater than peak to peak differences of an expected ripple in the output voltage. Therefore, the normal output ripple lies completely within the band and no error signal is generated due to ripple.

In the preferred embodiment, the differential circuit comprises an operational amplifier which is driven to increase the multiplier if the output voltage signal is below the low limit or to decrease the multiplier if the output voltage is above the high limit and which holds the multiplier constant if the output voltage is between the low and high limits. The operational amplifier is driven by a pair of differential amplifiers through respective diodes. The differential amplifiers may have a common reference as inputs, and other inputs to the differential amplifiers are then obtained from a voltage divider which attenuates the output voltage signal by different amounts.

A minor feedback loop about the multiplying circuit and differential circuit controls the gain of the major feedback loop. Thus, when the DC output voltage goes outside the regulation band, the incremental gain from the output voltage to the current command signal is now independent of the input line voltage.

Alternatives to the use of a dead band defined by high and low limits in the feedback circuit are a notch filter and a sample and hold circuit.

The AC to DC converter of the present invention provides nearly optimal regulation of the output voltage and power factor of over 99%. The circuit is well suited to discrete or integrated implementation. The preferred dead band embodiment is particularly advantageous because it does not require such difficult to implement elements as a sample and hold circuit, a square divider or a notch filter.

DESCRIPTION OF PREFERRED EMBODIMENTS

Figure 1:
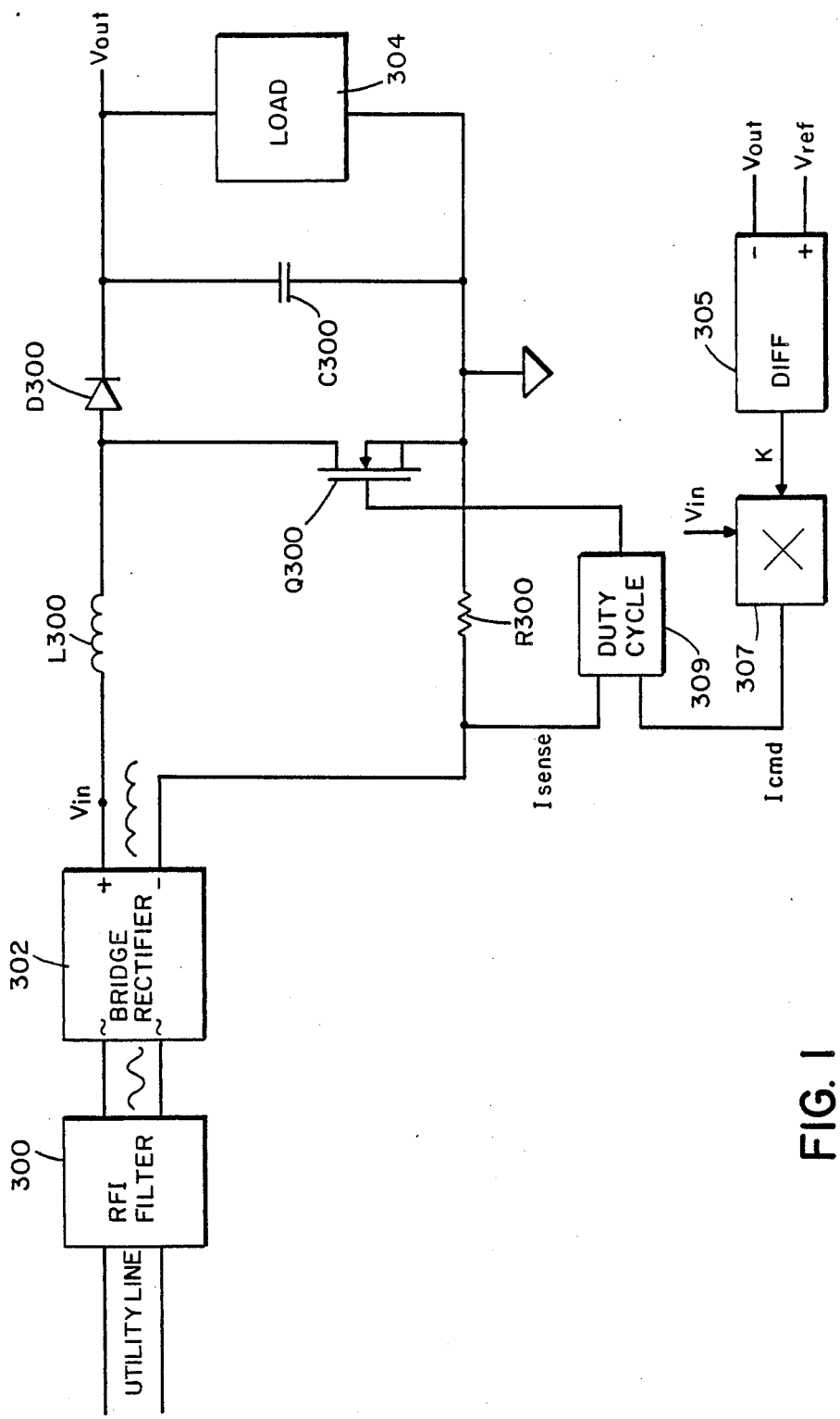
FIG. 1 is a schematic illustration of an AC to DC converter embodying the present invention.

FIG. 1 is a general illustration of an AC to DC converter embodying the present invention. The utility line is connected to a radio frequency interference filter 300 which is connected to a bridge rectifier 302. The rectifier converts the sinusoidal input to provide full wave rectification in which each half cycle is positive as illustrated at Vin. The rectified voltage is connected to a boost converter which includes an inductor L300, a diode D300 and a capacitor C300 connected in series. The capacitor C300 is connected across the constant power load 304 and serves as the power supply to the load. A shunting switch is provided in the form of a transistor Q300 across the diode and capacitor. The boost converter converts the line voltage to a DC level Vout of, for example, 400 volts on the capacitor C300 to supply the load 304.

The transistor Q300 is switched at a constant frequency of, for example, 40 kilohertz, but is duty cycle is modulated by a control circuit which includes a differential circuit 305, a multiplier 307 and a duty cycle generator 309. A signal Isense taken across a resistor R300 allows the control circuit to sense the rectified line current which passes through the inductor L300.

Switching of transistor Q300 results in a shunting current followed by relaxation current through the inductor L300. The system operates in a continuous mode in which current is always flowing through the inductor. The duty cycle controls the amplitude of the current and thus the voltage level to which the capacitor C300 is charged. The duty cycle is varied as a function of the difference between the actual current through the conductor indicated by Isense and a desired current signal Icmd. The signal Icmd is set equal to the voltage Vin multiplied by a constant K. The feedback control circuit selects a value K which provides a signal Icmd such that the desired output voltage is obtained. Thus, K is obtained from a differential circuit 305 which compares the output voltage with a reference voltage.

Thus, the objective of this circuit is to simultaneously maintain unity input power factor and regulate the output. In order to maintain unity input power factor, the input current to the boost converter is caused to be equal to some constant K times the input voltage. In order to regulate the output, K must be varied to maintain a constant output voltage. If the feedback loop from the output voltage to K is made too stiff, K will vary widely in an attempt to regulate out a low amplitude ripple on the output at twice the line frequency. This will cause significant distortion in the input current waveform and reduce the power factor. On the other hand, if the feedback gain is too low, the output voltage will vary widely in response to line and load transients.

In accordance with the present invention, very rapid response in regulating the voltage Vout is obtained, but with slow or zero response to the ripple.

Figure 2:
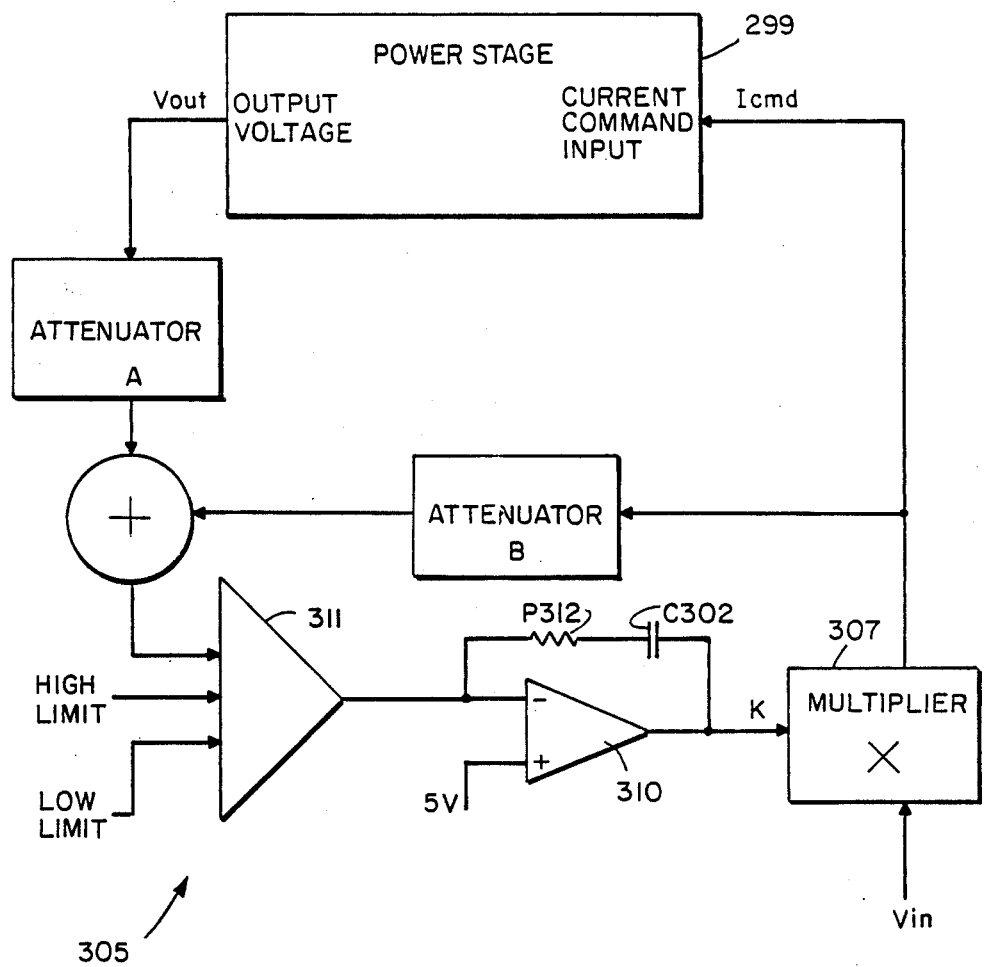
FIG. 2 is an illustration of one embodiment of the converter of FIG. 1 with the differential circuit shown in greater detail.

The circuit of FIG. 2 employs a dead band around the desired output voltage. As long as the output voltage remains within this dead band, K is held constant. If the voltage leaves the dead band, the control circuit regulates the output voltage back into the dead band as quickly as possible. The dead band is set slightly larger than the largest expected output ripple so that no attempt is made to regulate out the normal ripple.

In FIG. 2, the inductor, diode, capacitor and shunting switch, along with the duty cycle generator 39, are included in the power stage 299. FIG. 2 illustrates details of the differential circuit 305 with the multiplier 307. In this implementation, a transconductance amplifier 311 is implemented such that, when the output voltage is between the high limit and the low limit, the output current is zero. When the input exceeds the high limit or drops below the low limit, the amplifier goes into a high gain mode. When in the high gain mode, the amplifier 311 drives an operational amplifier 310. A series connected resistor R312 and capacitor C302 are connected from the output of the operational amplifier to the negative input of amplifier 310. The positive input is connected to a constant voltage. The amplifier 311 drives amplifier 310 to charge or discharge the capacitor C302 and set the value K. When amplifier 311 is not driving amplifier 310 in the dead band, the latter holds the value K constant.

When the value of Vout is such that the input to amplifier 311 is above the high limit, the value of K is reduced. On the other hand, when Vout is such that the input to amplifier 311 is less than the low limit, the value of K is increased. Because the dead band provided by amplifier 311 is just greater than the peak to peak differences in the ripple, any changes in the output voltage other than those resulting from ripple cause the amplifier 311 to conduct at least at the peaks of the ripple. When the output voltage stabilizes, the input to the amplifier 311 stabilizes to a level such that the ripple alternates within the dead band and causes no further adjustment of the value K.

It is necessary for stability that the loop crossover be at some frequency less than the right half plane (RHP) zero frequency of the boost stage. Subject to this constraint, the crossover frequency should be as high as possible for transient response. Referring to FIG. 2, if we choose the feedback gain from Vout to Icmd to be $$F(s) = (Vout\ C)/(2\ L\ Imax)$$

then the loop will cross over at a frequency equal to I/Imax/2 times the RHP zero frequency. In the above equation, Vout is the nominal value of the output voltage, C is the value of the inductor L300, and Imax is the maximum current which will ever flow through the inductor. I is the value of the inductor at a given instant. F(s) is the feedback gain as a function of frequency.

The dependency of F on Vin is avoided by using a minor loop around the multiplier. The minor loop, comprising the transconductance amplifier 311, the operational amplifier 310, the multiplier 307, the attenuator B and the summer 313, can have a high crossover frequency. Therefore, the closed loop gain is $-1/B$. The feedback gain around the boost element becomes $-A/B$ where A and B are the gains of the attenuators A and B. The minor loop desensitizes the feedback gain from Vin. When the transconductance amplifier is in the dead band, the feedback gain drops to zero. The input to the multiplier is just the voltage across C302. This voltage is the time average of the input voltage to the multiplier over the last RC time constant. For a 50 hertz or 60 hertz line frequency, a time constant of 20 milliseconds works well.

The use of a dead band in the feedback loop leads to reduced static regulation due to the fact that the output voltage floats around within this band rather than being regulated to a specific point. This could be corrected by having the feedback loop revert to a low gain rather than a zero gain mode. In our application, there was no perceived advantage to this, however, and it would have been an unnecessary complication to the circuit. The critical specification is the worst case output voltage excursions under transient conditions, not the static load characteristic.

Figure 3:
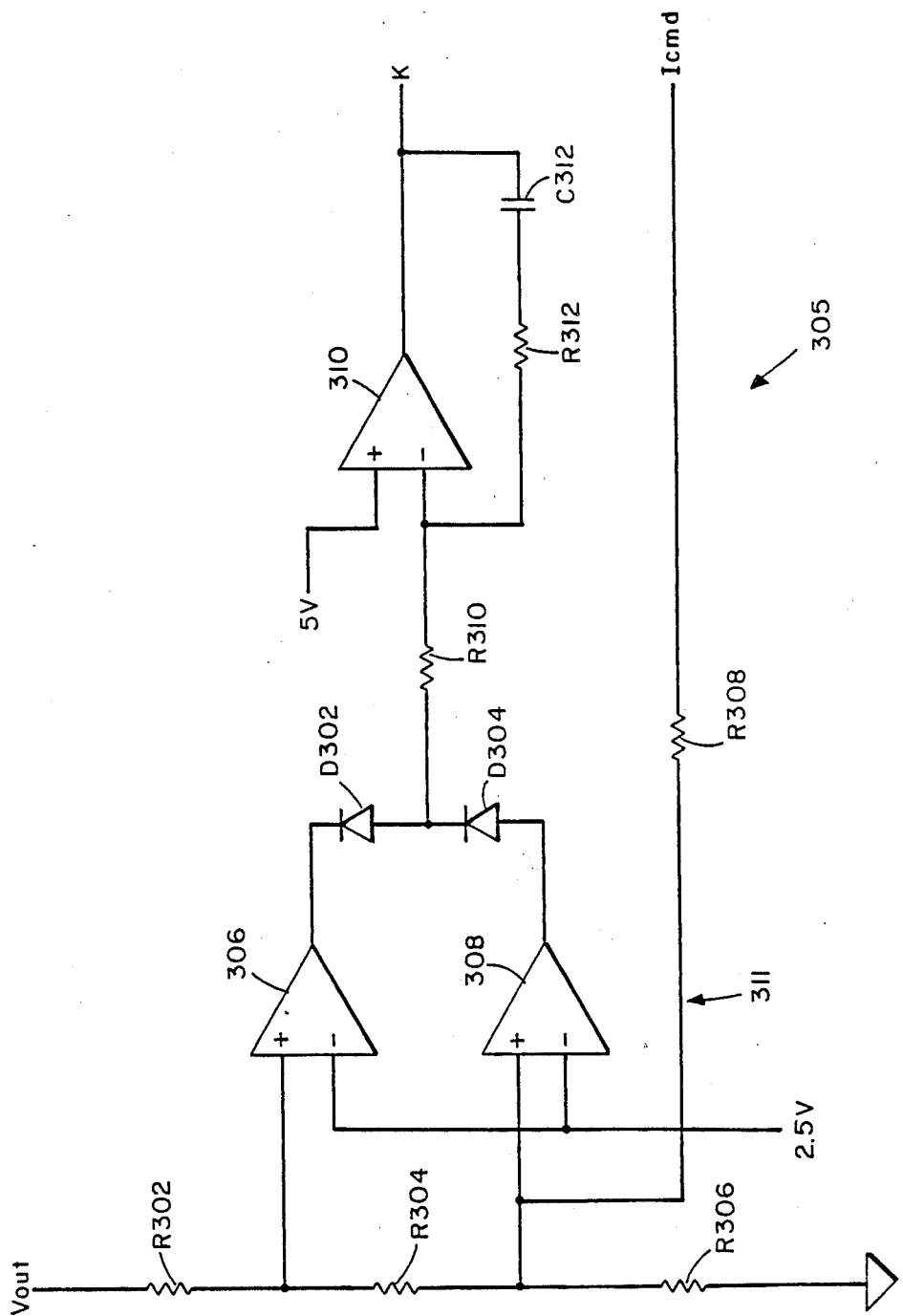
FIG. 3 is a detailed schematic of the differential circuit of FIG. 2.
Figure 4:
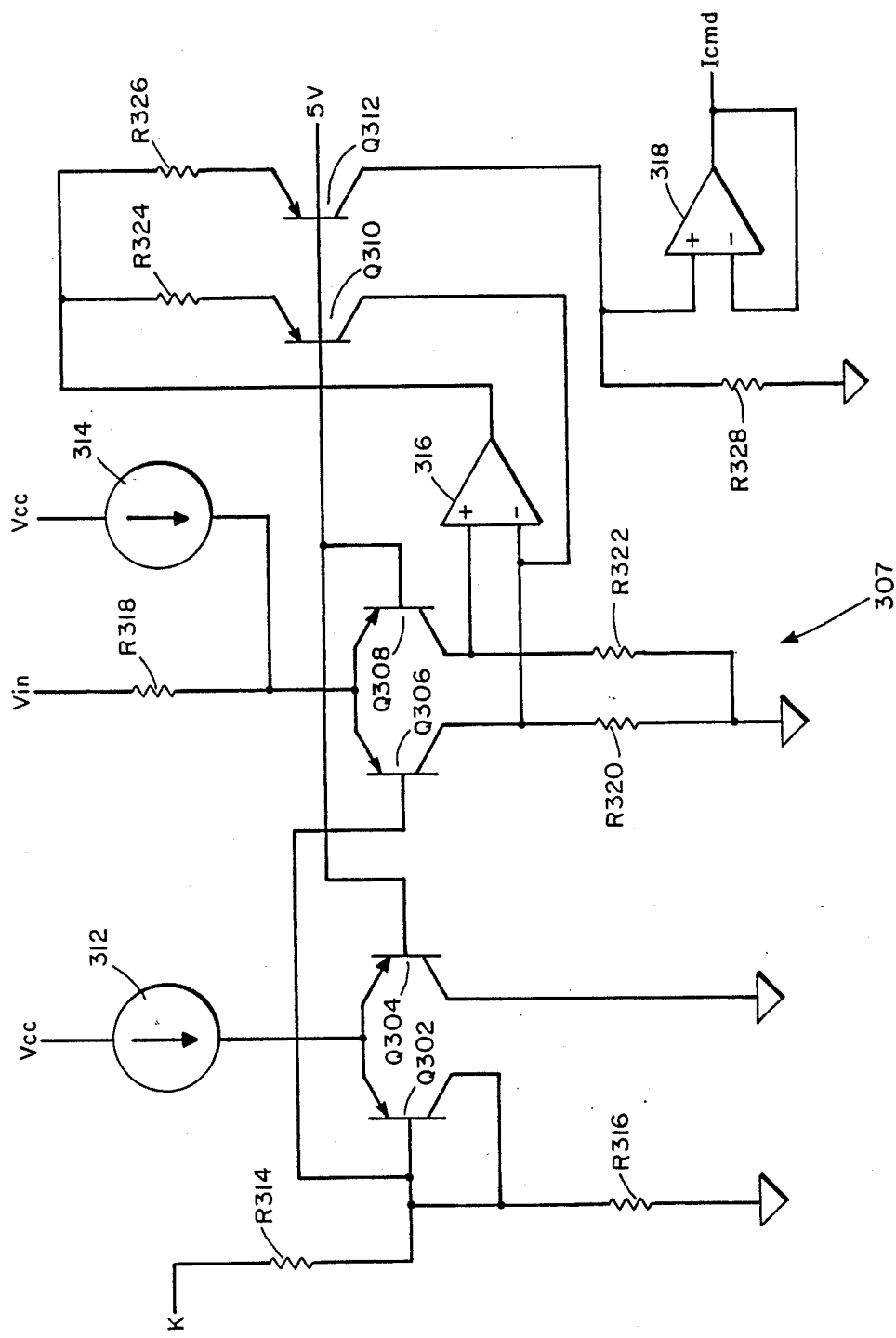
FIG. 4 is a detailed schematic illustration of the multiplier circuit in the embodiment of FIG. 2.
Figure 5:
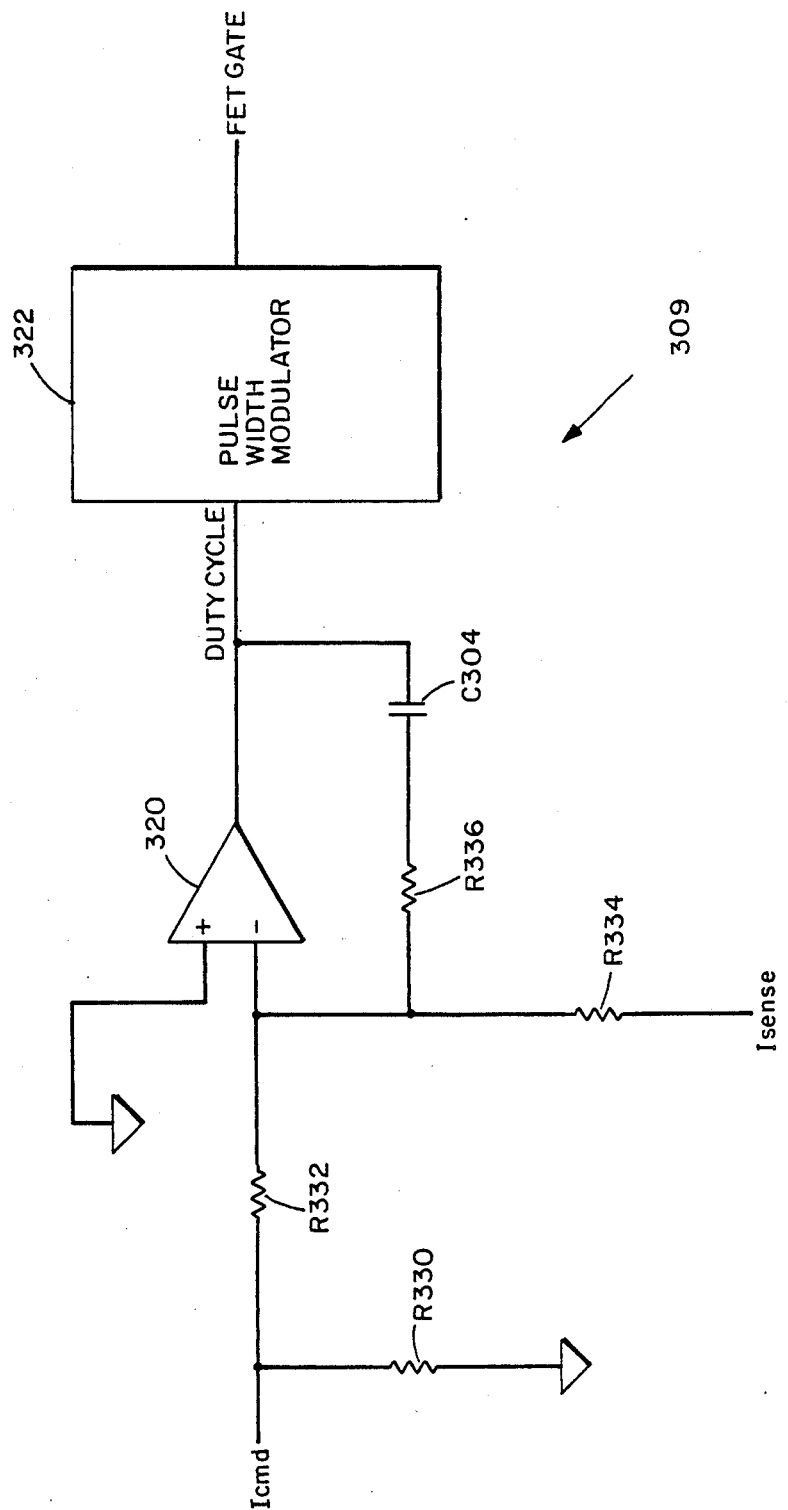
FIG. 5 is a detailed schematic of the duty cycle circuit in the embodiment of FIG. 2.

Detailed schematics of the differential circuit 305, multiplier 307 and duty cycle generator 309 in the implementation of FIG. 2 are presented in FIGS. 3, 4 and 5.

In FIG. 3, the resistor 302 can be seen as attenuator A from FIG. 2 and resistor R308 as attenuator B. The amplifier 311 comprises differential amplifiers 306 and 308.

The output voltage, Vout, is divided down through resistors R302, R304 and R306, and fed into operational amplifiers 306 and 308. These create an error signal when Vout exceeds its lower or upper limits, respectively. Diodes D302 and D304 disconnect these operational amplifiers from R310 whenever Vout is within its regulation band. R310 injects a current into the minus input of operational amplifier 310 which is proportional to the error signal generated by operational amplifiers 306 and 308. The output of operational amplifier 310, called K, represents the ratio of the input line current to the input line voltage. When diodes D302 and D304 are off, the voltage at K is the stored voltage on capacitor C302 with a five-volt offset. When one of these diodes turns on, the voltage at K is affected accordingly and the voltage stored on capacitor C302 is changed. Resistor R308 provides feedback from the commanded input line current, Icmd, to the error amplifiers 306 and 308.

The voltage level K is fed through resistor R314 (FIG. 4) into the multiplier circuit comprising transistors Q302, Q304, Q306 and Q308. The collector current of transistor Q302 is determined by the voltage level K and resistors R314 and R316. Current source 312 determines the combined collector currents of transistors Q302 and Q304. The differential base voltage between transistors Q306 and Q308 is constrained to be the same as the differential base voltage between Q302 and Q304. The differential collector currents between transistors Q306 and Q308 is therefore equal to the combined emitter currents of Q306 and Q308 times the value of K added to an offset. The offset is not important since it is taken out by the feedback loop. The combined emitter current of Q306 and Q308 is proportional to the rectified line voltage because of resistor R318. Current source 314 corrects for the offset due to the base of transistor Q308 being biased up to 5 volts base voltage.

The output of operational amplifier 316 creates equal collector currents through transistors Q310 and Q312 because of resistors R324 and R326 which are equal in value. The amplifier 316 constrains the plus and minus input voltages to be equal. Since resistors R320 and R322 are equal in value, the collector current of transistor Q310 must be equal to the difference between the collector current of transistor Q308 and transistor Q306. Icmd which is generated by operational amplifier 318 therefore equals this difference in collector currents times the value of resistor R328. In this fashion, the commanded input line current, Icmd, is made equal to K plus an offset times the input line voltage. Resistor R330 (FIG. 5) guarantees that the output range of amplifier 318 can go all the way to zero volts.

Operational amplifier 320 compares the actual value of the input line current through Isense with the commanded value, Icmd. The resulting error is fed into pulse width modulator 322. Resistors R332, R334, R336 and capacitor C304 determine gain and provide loop compensation. The pulse width modulator 322 can be a UC3843 or other similar industry standard part. This PWM is interfaced to the transistor Q300 such that Q300 turns on and off at some frequency, and the percentage of time that Q300 is on is proportional to the duty cycle input to the PWM.

Figure 6:
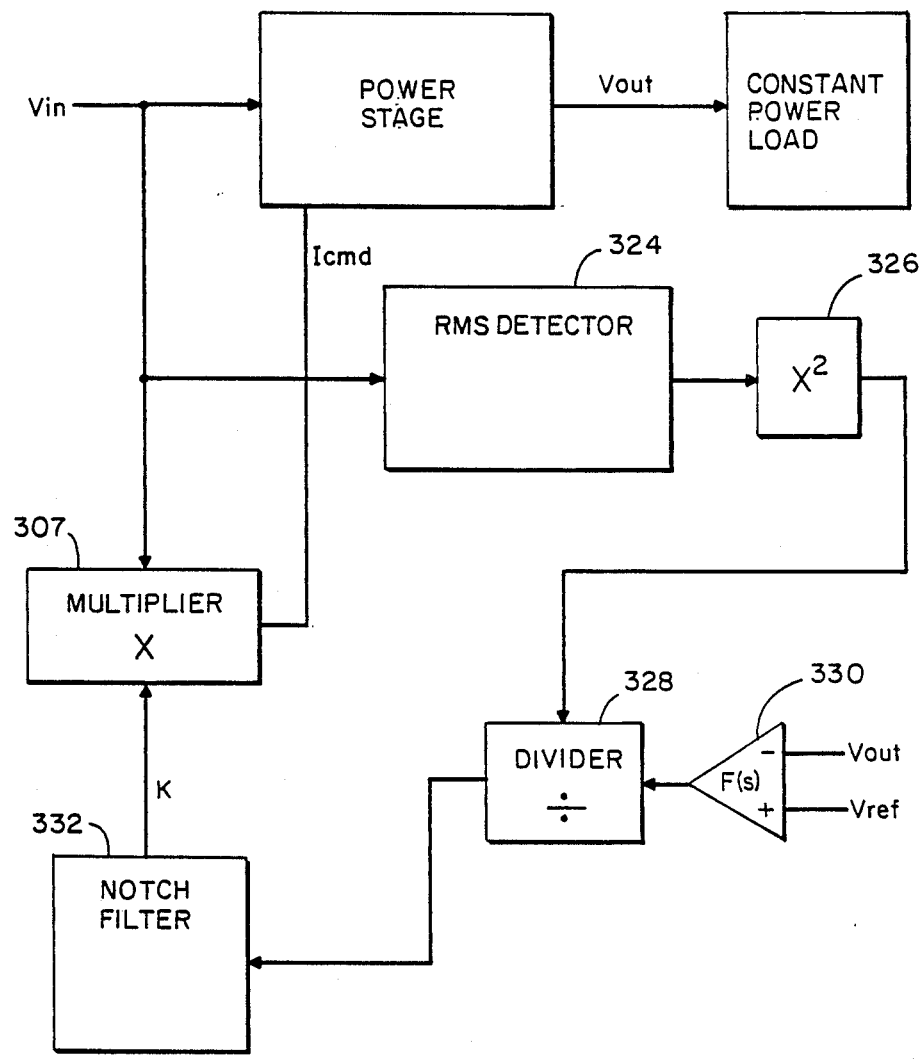
FIG. 6 is an illustration of an alternative embodiment of the converter of FIG. 1.

A less preferred alternative to the system of FIGS. 2-5, is illustrated in FIG. 6. This embodiment provides a modification of the system presented in U.S. Pat. No. 4,677,366. As disclosed in that patent, the differential circuit includes an RMS detector 324, squarer 326 and divider 328. The output from a differential amplifier 330, which indicates the difference between the output voltage and reference voltage, is divided by the square of the RMS of the input voltage. This configuration maintains the uniform loop gain with changes in line voltage that is maintained in the prior embodiment by the attenuators A and B. The RMS, squarer, divider circuit alone results in a trade-off between input power factor and transient response. The power factor deteriorates when the loop gain is increased because the loop tries to regulate out the normal output ripple and in so doing distorts the input current waveform. In accordance with the present invention, response to the ripple can be eliminated by including a notch filter 332 in the feedback circuit. That notch filter is tuned to the frequency of the ripple. A disadvantage of this approach is that the notch filter must be closely tuned and thus requires tight tolerances on component values. Further, it complicates operation of the circuit at either 50 or 60 hertz.

Figure 7:
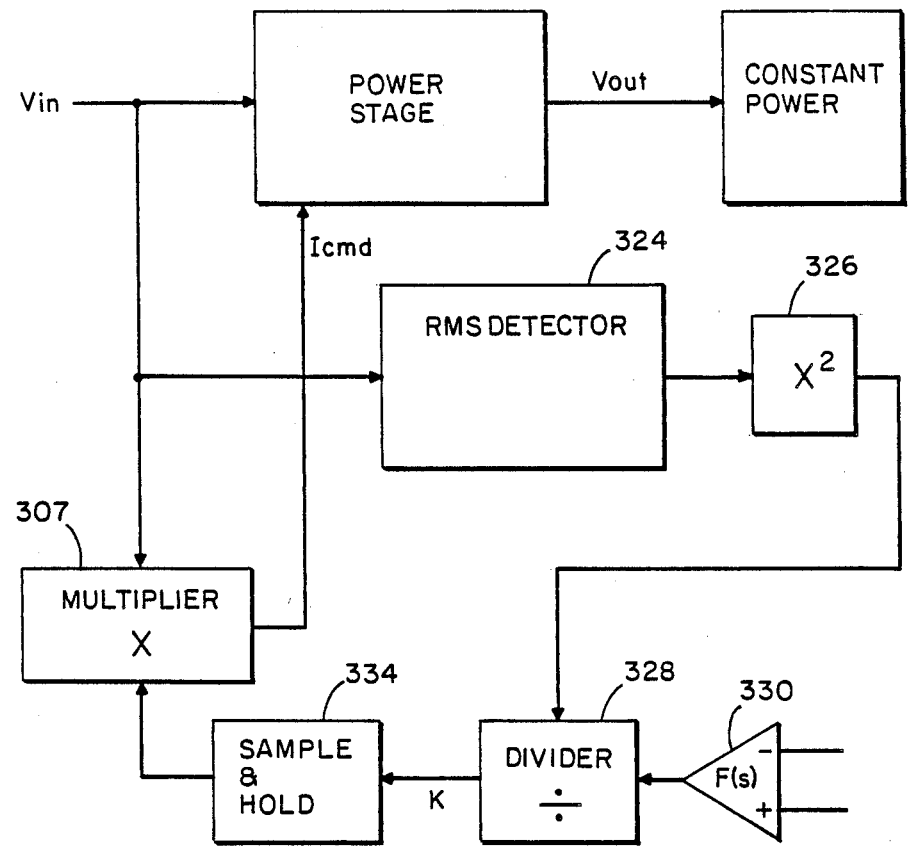
FIG. 7 is an illustration of a third embodiment of the converter of FIG. 1.

An alternative to the approach of FIG. 6 is presented in FIG. 7. In this case, a sample and hold circuit 334 is added to the feedback path in the differential circuitry. The signal into the multiplier is sampled at the ripple frequency to remove any ripple at the sampling frequency. This circuit provides rapid recovery from low transients after the next sampling period, but there is considerable deviation in the output voltage during the half cycle between the time of the load transient and the time of the next sampling.

While this invention has been particularly shown and described with references to preferred embodiments thereof, it will be understood by those skilled in the art that various changes in form and details may be made therein without departing from the spirit and scope of the invention as defined by the appended claims.

I claim:

1. An AC to DC converter comprising a circuit which includes an inductor and a diode connected in series with a load capacitor and a shunting switch connected to shunt the diode and load capacitor, the shunting switch being controlled by a control circuit at a frequency which is high relative to the frequency of the AC input, the control circuit comprising:
  a differential circuit for comparing an output voltage signal, which indicates the voltage on the load capacitor, to at least one reference to generate a multiplier, such that the product of the multiplier and a voltage input signal indicative of the voltage input to the inductor is proportional to current through the inductor required to provide a desired level of the output voltage, the differential circuit including means to eliminate response of the multiplier to expected ripple in the output signal;
  a multiplying circuit for multiplying the multiplier and the voltage input signal to generate a current command signal; and
  a duty cycle generator responsive to the current command signal and an inductor current signal, which indicates the current through the inductor, to control the duty cycle of the shunting switch.

2. An AC to DC converter as claimed in claim 1 wherein the differential circuit responds only to levels of the output voltage which are above a high limit or below a low limit which border a dead band, the dead band between the limits being about but greater than the peak to peak differential of the ripple.

3. An AC to DC converter as claimed in claim 1 wherein the differential circuit includes a notch filter to eliminate response to the expected ripple.

4. An AC to DC converter as claimed in claim 1 wherein the differential circuit includes a sample and hold circuit to eliminate response to the expected ripple.

5. An AC to DC converter as claimed in claim 1 further comprising a minor feedback loop around circuitry including the differential circuit to set the gain of the control circuit independent of voltage input to the converter.

6. An AC to DC converter comprising a circuit which includes an inductor and a diode connected in series with a load capacitor and a shunting switch connected to shunt the diode and load capacitor, the shunting switch being controlled by a control circuit at a frequency which is high relative to the frequency of the AC input, the control circuit comprising:
  a differential circuit for comparing an output voltage signal, which indicates the voltage on the load capacitor, to at least one reference to generate a feedback signal, the differential circuit responding rapidly to levels of the output voltage signal which are outside of high and low limits of amplitude to change the feedback signal, any response of the differential circuit to levels of the output voltage which are within the high and low limits of amplitude being slow; and
  a duty cycle generator responsive to the feedback signal to control the duty cycle of the shunting switch.

7. An AC to DC converter as claimed in claim 6 wherein the difference between the high and low limits of the comparator circuit is about equal to but greater than peak to peak differences of an expected ripple in the output voltage.

8. An AC to DC converter as claimed in claim 6 wherein the differential circuit comprises an operational amplifier which is driven to increase the feedback signal if the output voltage signal is below the low limit or to decrease the feedback signal if the output voltage is above the high limit and to hold the feedback signal constant if the output voltage is between the low and high limits.

9. An AC to DC converter as claimed in claim 8 wherein the operational amplifier is driven by a pair of differential amplifiers through respective diodes.

10. An AC to DC converter as claimed in claim 9 wherein the differential amplifiers have a common reference as inputs thereto, the differential circuit further comprising a voltage divider for attenuating the output voltage signal by different amounts.

11. An AC to DC converter as claimed in claim 8 further comprising a minor feedback loop about circuitry including the differential circuit.

12. An AC to DC converter as claimed in claim 6 further comprising a minor feedback loop about circuitry including the differential circuit.

13. An AC to DC converter comprising a circuit which includes an inductor and a diode connected in series with a load capacitor and a shunting switch connected to shunt the diode and load capacitor, the shunting switch being controlled by a control circuit at a frequency which is high relative to the frequency of the AC input, the control circuit comprising:
  a differential circuit for comparing an output voltage signal, which indicates the voltage on the load capacitor, to at least one reference to generate a multiplier, such that the product of the multiplier and a voltage input signal indicative of the voltage input to the inductor is proportional to current through the inductor required to provide a desired level of the output voltage, the differential circuit responding rapidly to levels of the output voltage signal which are outside of high and low limits of amplitude to change the multiplier, any response of the differential circuit to levels of the output voltage which are within the high and low limits of amplitude being slow;
  a multiplying circuit for multiplying the multiplier and the voltage input signal to generate a current command signal; and
  a duty signal generator responsive to the current command signal and an inductor current signal, which indicates the current through the inductor, to control the duty cycle of the shunting switch.

14. An AC to DC converter as claimed in claim 13 wherein the difference between the high and low limits of the comparator circuit is about equal to but greater than peak to peak differences of an expected ripple in the output voltage.

15. An AC to DC converter as claimed in claim 13 wherein the differential circuit comprises an operational amplifier which is driven to increase the multiplier if the output voltage signal is below the low limit or to decrease the multiplier if the output voltage is above the high limit and to hold the multiplier constant if the output voltage is between the low and high limits.

16. An AC to DC converter as claimed in claim 15 wherein the operational amplifier is driven by a pair of differential amplifiers through respective diodes.

17. An AC to DC converter as claimed in claim 16 wherein the differential amplifiers have a common reference as inputs thereto, the differential circuit further comprising a voltage divider for attenuating the output voltage signal by different amounts.

18. An AC to DC converter as claimed in claim 15 further comprising a minor feedback loop about circuitry including the differential circuit.

19. An AC to DC converter as claimed in claim 13 further comprising a minor feedback loop about circuitry including the differential circuit.

* * * * *